(12) United States Patent
Datta et al.

(10) Patent No.: US 9,262,445 B2
(45) Date of Patent: *Feb. 16, 2016

(54) IMAGE RANKING BASED ON ATTRIBUTE CORRELATION

(71) Applicant: International Business Machines Corporation, Armonk, NY (US)

(72) Inventors: Ankur Datta, White Plains, NY (US); Rogerio S. Feris, Hartford, CT (US); Sharathchandra U. Pankanti, Darien, CT (US); Behjat Siddiquie, College Park, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/516,943

(22) Filed: Oct. 17, 2014

(65) Prior Publication Data

US 2015/0039542 A1 Feb. 5, 2015

Related U.S. Application Data

(63) Continuation of application No. 13/152,615, filed on Jun. 3, 2011, now Pat. No. 8,903,198.

(51) Int. Cl.
*G06K 9/64* (2006.01)
*G06F 17/30* (2006.01)
(Continued)

(52) U.S. Cl.
CPC ...... *G06F 17/30277* (2013.01); *G06F 17/3028* (2013.01); *G06K 9/6263* (2013.01); *G06N 99/005* (2013.01)

(58) Field of Classification Search
None
See application file for complete search history.

(56) References Cited

U.S. PATENT DOCUMENTS

| 5,630,121 A | * | 5/1997 | Braden-Harder | G06F 17/30265 |
| 7,519,200 B2 | | 4/2009 | Gokturk et al. | |
| 7,684,651 B2 | * | 3/2010 | Tang | G06F 17/30247 382/115 |

(Continued)

FOREIGN PATENT DOCUMENTS

| JP | 2009271577 A1 | 11/2009 |
| JP | 2010257449 A1 | 11/2010 |
| WO | WO201003736 A1 | 9/2010 |

OTHER PUBLICATIONS

Lu et al, Ethnicity Identification from Face Images, Proc. Int'l Soc. Optical Eng. (SPIE), 2004, vol. 5404, pp. 114-123.

(Continued)

*Primary Examiner* — Jayesh A Patel
(74) *Attorney, Agent, or Firm* — Patrick J. Daugherty; Driggs, Hogg, Daugherty & Del Zoppo Co., LPA

(57) ABSTRACT

Images are retrieved and ranked according to relevance to attributes of a multi-attribute query through training image attribute detectors for different attributes annotated in a training dataset. Pair-wise correlations are learned between pairs of the annotated attributes from the training dataset of images. Image datasets may are searched via the trained attribute detectors for images comprising attributes in a multi-attribute query. The retrieved images are ranked as a function of comprising attributes that are not within the query subset plurality of attributes but are paired to one of the query subset plurality of attributes by the pair-wise correlations, wherein the ranking is an order of likelihood that the different ones of the attributes will appear in an image with the paired one of the query subset plurality of attributes.

20 Claims, 3 Drawing Sheets

(51) Int. Cl.
*G06K 9/62* (2006.01)
*G06N 99/00* (2010.01)

(56) References Cited

U.S. PATENT DOCUMENTS

| | | | |
|---|---|---|---|
| 7,860,347 B2 | 12/2010 | Tang et al. | |
| 8,213,689 B2* | 7/2012 | Yagnik | G06F 17/30781 382/118 |
| 8,520,906 B1* | 8/2013 | Moon | G06K 9/6263 382/118 |
| 8,571,850 B2* | 10/2013 | Li | G06F 17/241 382/224 |
| 8,903,198 B2* | 12/2014 | Datta et al. | 382/305 |
| 2006/0173909 A1* | 8/2006 | Carlson | G06F 17/30265 |
| 2007/0003113 A1 | 1/2007 | Goldberg | |
| 2007/0078873 A1 | 4/2007 | Avinash et al. | |
| 2008/0080743 A1* | 4/2008 | Schneiderman | G06F 17/30793 382/118 |
| 2008/0304755 A1* | 12/2008 | Xiao | G06F 17/30017 382/225 |
| 2009/0313294 A1* | 12/2009 | Mei | G06F 17/3028 |
| 2010/0008547 A1* | 1/2010 | Yagnik | G06F 17/30781 382/118 |
| 2010/0254577 A1* | 10/2010 | Vanhoucke | G06F 17/30253 382/118 |

OTHER PUBLICATIONS

Khoury et al, Search Engines for Digital Images using MSA, Proceedings of the 11th WSEAS International Conference on Mathematical Methods, Computational Techniques and Intelligent Systems, MAMECTIS 2009, 8th WSEAS Int. Conf. NOLASC 2009, 5th WSEAS Int. Conf. Control 2009, pp. 362-366.

Wilfred et al, Facial component features for facial expression identification using Active Appearance Models, IEEE Africon 2009, 5 pp.

You et al, On Hierarchical Content-based Image Retrieval by Dynamic Indexing and Guided Search, Proceedings of the 2009 8th IEEE International Conference on Cognitive Informatics, ICCI 2009, CFP09312-PRT, pp. 188-195.

U.S. Appl. No. 12/845,095, entitled Semantic Parsing of Objects in Video, assigned to International Business Machines Corporation, pp. 1-34.

U.S. Appl. No. 13/152,615, filed Jun. 3, 2011.

Notice of Allowance (Mail Date Jul. 28, 2014) for U.S. Appl. No. 13/152,615, filed Jun. 3, 2011.

* cited by examiner

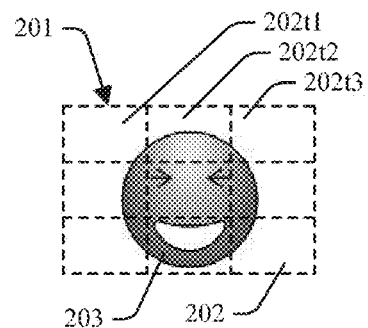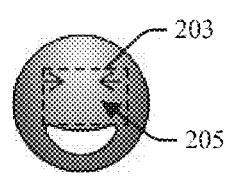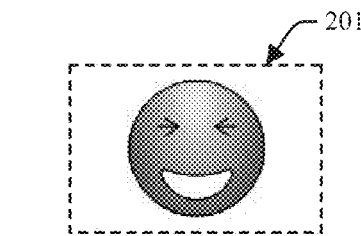
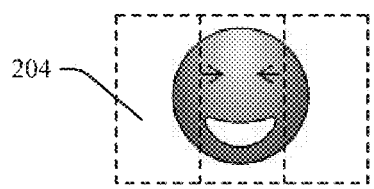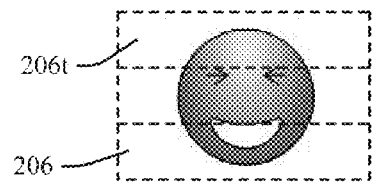
FIG 2A     FIG 2B     FIG 2C     FIG 2D     FIG 2E
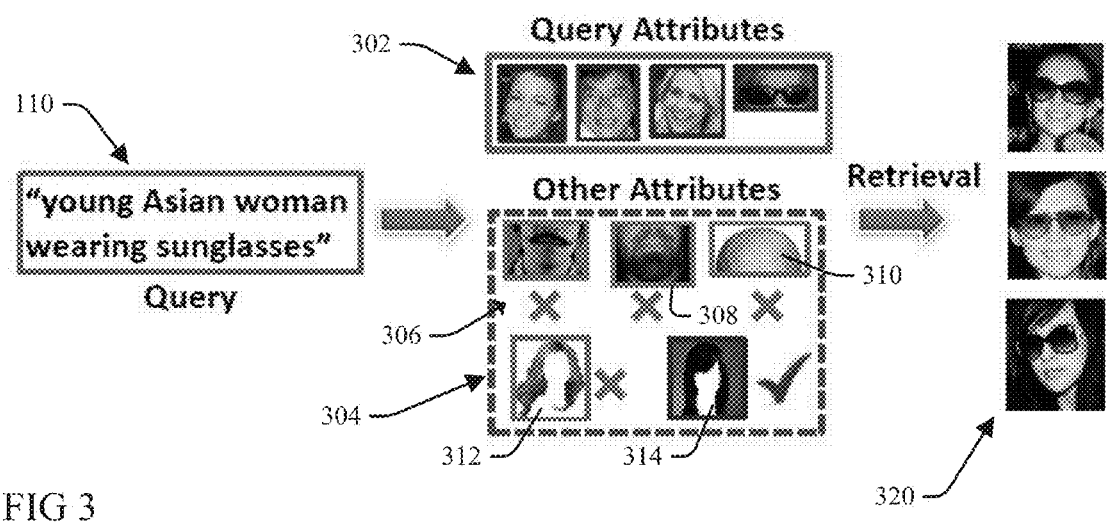
FIG 3

IMAGE RANKING BASED ON ATTRIBUTE CORRELATION

BACKGROUND

The present invention relates to utilizing computer vision applications for the automated searching of human image data for people as a function of visual appearance characteristics.

Video, still camera and other image data feeds may be searched to find targeted objects or individuals. For example, to search for a person, one may provide description information indicating certain personal facial visual traits to a manager of a video archive (for example, wearing glasses, baseball hat, etc.), wherein the archive may be manually scanned looking for one or more people with similar characteristics. Such a manual search is both time and human resource consuming. Moreover, human visual attention may be ineffective, particularly for large volumes of image data. Due to many factors, illustratively including an infrequency of activities of interest, a fundamental tedium associated with the task and poor reliability in object tracking in environments with visual clutter and other distractions, human analysis of input information may be both expensive and ineffective.

Automated input systems and methods are known wherein computers or other programmable devices directly analyze video data and attempt to recognize objects, people, events or activities of concern through computer vision applications. Some existing approaches learn a separate appearance model for each of a plurality of image attributes, for example for bald, mustache, beard, hat, sunglasses, light skin-tones, etc. When given a multi-attribute query, such systems may add up the confidence scores for each individual query attribute. Thus, a search for a (i) male (ii) wearing glasses and (iii) a beard may retrieve a plurality of results that each have a confidence score meeting all of three of the attributes, or that each meet one or more. However, the former technique may miss results, for example where one of the attributes is indistinct in a given image resulting in its exclusion. The latter may return too many results, including impossibilities or improbabilities as to meeting all three, such as an image of a person wearing glasses that is a young girl). Thus, the returned results may miss a target, or return too many hits to be analyzed efficiently.

BRIEF SUMMARY

In one embodiment of the present invention, a method for retrieving and ranking multi-attribute query results according to relevance to attributes of a multi-attribute query includes training image attribute detectors for each of different attributes that are annotated in a training dataset of images of people and learning (via a processor, etc.) pair-wise correlations between each pair of the annotated attributes from the training dataset of images. Image datasets are searched via the trained attribute detectors for images comprising attributes in a multi-attribute query. The retrieved images are ranked as a function of comprising attributes that are not within the query subset plurality of attributes but are paired to one of the query subset plurality of attributes by the pair-wise correlations, wherein the ranking is an order of likelihood that the different ones of the attributes will appear in an image with the paired one of the query subset plurality of attributes.

In another embodiment, a system has a processing unit, computer readable memory and a computer readable storage medium device with program instructions to train image attribute detectors for each of different attributes that are annotated in a training dataset of images of people and learn pair-wise correlations between each pair of the annotated attributes from the training dataset of images. Image datasets are searched via the trained attribute detectors for images comprising attributes in a multi-attribute query. The retrieved images are ranked as a function of comprising attributes that are not within the query subset plurality of attributes but are paired to one of the query subset plurality of attributes by the pair-wise correlations, wherein the ranking is an order of likelihood that the different ones of the attributes will appear in an image with the paired one of the query subset plurality of attributes.

In another embodiment, an article of manufacture has a computer readable storage medium device with computer readable program code embodied therewith, the computer readable program code comprising instructions that, when executed by a computer processor, cause the computer processor to train image attribute detectors for each of different attributes that are annotated in a training dataset of images of people and learn pair-wise correlations between each pair of the annotated attributes from the training dataset of images. Image datasets are searched via the trained attribute detectors for images comprising attributes in a multi-attribute query. The retrieved images are ranked as a function of comprising attributes that are not within the query subset plurality of attributes but are paired to one of the query subset plurality of attributes by the pair-wise correlations, wherein the ranking is an order of likelihood that the different ones of the attributes will appear in an image with the paired one of the query subset plurality of attributes.

In another embodiment, a method provides a service for retrieving and ranking multi-attribute query results according to relevance to attributes of a multi-attribute query. Computer-readable program code is integrated into a computer system that includes a processor, a computer readable memory in circuit communication with the processor, and a computer readable storage medium in circuit communication with the processor. The processor executes program code instructions stored on the computer-readable storage medium via the computer readable memory and thereby trains image attribute detectors for each of different attributes that are annotated in a training dataset of images of people, and learns pair-wise correlations between each pair of the annotated attributes from the training dataset of images. Image datasets are searched by the processor via the trained attribute detectors for images comprising attributes in a multi-attribute query. The retrieved images are ranked by the processor as a function of comprising attributes that are not within the query subset plurality of attributes but are paired to one of the query subset plurality of attributes by the pair-wise correlations, wherein the ranking is an order of likelihood that the different ones of the attributes will appear in an image with the paired one of the query subset plurality of attributes.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which:

FIGS. 2A through 2E are diagrammatical illustrations of image field configurations for extracting feature vectors according to embodiments of the present invention.

FIG. 3 is a diagrammatical illustration of an exemplary image retrieval and ranking as a function of a multi-attribute query according to embodiments of the present invention.

Figure 1:
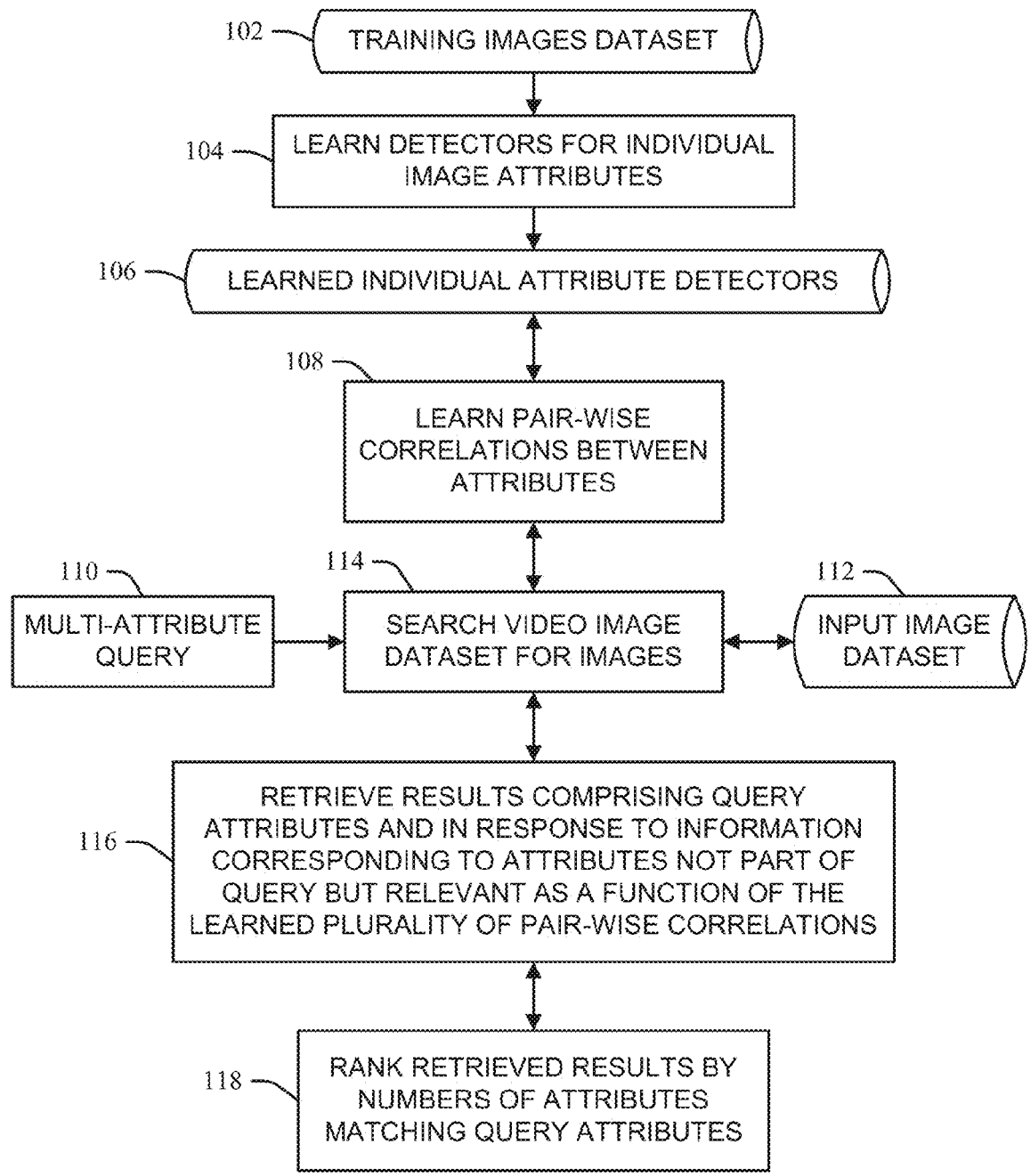
FIG. 1 is a flow chart illustration of an embodiment of a method or system for ranking multi-attribute query results according to relevance to the multi-attribute query according to the present invention.

The drawings are not necessarily to scale. The drawings are merely schematic representations, not intended to portray specific parameters of the invention. The drawings are intended to depict only typical embodiments of the invention and, therefore, should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a method, system or process for ranking multi-attribute query results according to relevance to the multi-attribute query is illustrated. A training dataset 102 of images of people annotated with various, different attributes (for example, blonde hair, long hair, eyeglasses, baseball hat, earrings, mustache, etc.) is used to train or learn image detectors at 104 and thereby generate a set of individual detectors 106 for each of the annotated attributes. At 108 a plurality of pair-wise correlations between each pair of attributes from the set of attributes is learned from the training dataset of images, for example via a processor, programmed device, etc.

At 114 an input image dataset 112 is searched via the trained attribute detectors for images comprising at least one or otherwise satisfying the multi-attribute query attributes 110. Examples of the input image dataset 112 include archived video data stored in a storage means, live video images processed in real-time through computer vision processes, still photography or image archives or real-time feeds, and still other image datasets 112 may be practiced. At 116 a plurality of images is retrieved from the searching of the image dataset 112 that each comprise at least one of the query attributes while also taking into account (thus, in response to) information from the trained attribute detectors corresponding to attributes that are not a part of the query but are relevant to the query attributes as a function of the learned plurality of pair-wise correlations. Accordingly, at 118 the retrieved results are ranked as a function of a total number of their attributes that are also the query attributes. For example, the ranking function rank images containing the highest number of attributes in the query at the top, and images with the next highest number of matching attributes next and so on.

More particularly, feature vector outputs of the individual image detectors 106 in response to multi-attribute samples present in the training dataset 102 are used to learn a multi-attribute retrieval and ranking model through learning pair-wise correlations at 108 of all pairs of the attributes. Thus, embodiments of the present invention provide a multi-attribute retrieval and ranking model that retrieves pluralities of result images from searching image data that each (i) comprise at least one of the query 110 attributes, and (ii) wherein the learned pair-wise correlations indicate that the other attributes of the returned images are also concurrent to the query attributes and/or to other remainder attributes within the complete set of considered attributes that are not part of the query but are relevant to the query attributes. The model further ranks or otherwise prioritizes the returned results as a function of a total number of their attributes that are also the query attributes, with images with higher numbers of the query attributes ranked ahead of those with lower numbers.

The model thus retrieves and ranks target images sought in satisfaction of the query 110 as a function of both total number of relevant attributes and the pair-wise correlations of the query attributes to the remaining attributes. In some embodiments, the attributes may be weighted, and the ranking thus a function of total values of the weighted attributes. For example, where two results have the same number of matching attributes but with different weightings, the one with more heavily weighted attributes will be ranked first.

A large variety of features may be extracted for representing each training dataset 102 or image dataset 112 image. Color based features include color histograms, color corelograms, color wavelets and color moments. Texture may be encoded using wavelet texture and Local Binary Patterns (LBP) histograms, while shape information is represented using edge histograms, shape moments and scale-invariant feature transform (SIFT) based visual words, etc. Referring now to FIGS. 2A through 2E, in one embodiment, feature vectors are extracted from the image field 201 of each facial image 203 with respect to five different configurations and concatenated; a layout configuration of FIG. 2A that extracts features from each of a three-by-three array of grids 202; a center configuration of FIG. 2B that extracts features from only the center grid 203 (and which thus focuses on facial features 205 of the underlying facial image 203); a global configuration of FIG. 2C that extracts features from the whole image field 201 irrespective of the grids 202; a vertical configuration of FIG. 2D that extracts features from three vertical columns 204 formed by the grids 202; and a horizontal configuration of FIG. 2E that extracts features from three horizontal rows 206 formed by the grids 202. This enables localization of individual attribute detectors: for example, in one embodiment, the attribute detectors for "hat" or "bald" attributes may give higher weights to features extracted from the topmost row 206*t* of grids 202 in the horizontal configuration of FIG. 2E, and in the three top-most grids 202*t*1, 202*t*2 and 202*t*3 in the layout configuration of FIG. 2A.

Training the multi-attribute retrieval and ranking model may be accomplished through minimizing ranking losses. In some embodiments, training at 104 comprises extracting image features and employing Adaboost, an Adaptive Boosting machine learning algorithm, to learn discriminative features for each detector attribute. Further, a wide variety of extracted attributes may be used in the training dataset 102 to learn or train the detectors at 104 to thereby rank and retrieve images in the learned models 106 based on semantic attributes. Examples include attributes describing the physical traits of a person including facial attributes (e.g. hair color, presence of beard or mustache, presence of eyeglasses or sunglasses etc.), body attributes (e.g. color of shirt and pants, striped shirt, long/short sleeves etc.), demographic attributes (e.g. age, race, gender) and even non-visual attributes (e.g. voice type, temperature and odor) which could potentially be obtained from other sensors. Moreover, while searching for images of people may involve only a single object class (human faces), embodiments may be utilized for attribute-based retrieval of images containing multiple object classes (for example, clothing, associated tangible items such as backpacks or bicycles, etc.). Still other classes and attributes will be apparent to one skilled in the art.

Prior art approaches typically learn a separate appearance model for each attribute, and when given a multi-attribute query simply add up the confidence scores of each individual attribute to return results. However, such approaches consider only the attributes that are part of the query for retrieving relevant images, and generally fail to consider the concurrence relationships between these attributes as well as between other, different attributes outside of the query. In contrast, embodiments of the present invention also take into account pair-wise correlations to those other remainder attributes within the complete set of considered attributes that are not a part of the query but are useful in ranking the results. For example, an Asian nationality person is highly unlikely to have blonde hair, but is highly likely to have black hair, and a female person is highly extremely unlikely to have a beard or a mustache; merely adding confidences of the separate detectors under prior art methods will not reflect these concurrence relationships, and will thus fail to take into account attributes that are not part of the query.

Embodiments of the present invention provide frameworks for multi-attribute image retrieval and ranking which retrieve images based not only on the words that are part of the query 110, but also considers the remaining attributes within the vocabulary that could potentially provide information about the query. For example, FIG. 3 illustrates one application of a query 110 for "young Asian woman wearing sunglasses." Images are retrieved and ranked with respect to relevance to attributes 302 that are part of the query, and further taking into account attributes 304 that are not part of the query and inferring through pair-wise attribute correlations that images are unlikely to be relevant (thus, ranked lower or in some cases eliminated) if they also have a mustache 306, beard 308, bald 310 or blonde/light red hair 312 attributes, but are more likely to be relevant (thus, ranked higher) if they a black hair attribute 314, resulting in prioritized and ranked image results 320.

Pair-wise correlation co-occurrences may vary in ranking effect. For example, for a query containing the attribute "young," pictures containing people with gray hair can be discarded as gray hair usually occurs only in older people and a person with grey hair is unlikely to be "young"; thus, such image results may be filtered out or otherwise removed from the results retrieved at 116 (FIG. 1) and/or ranked at 118 (FIG. 1) as a function of said specific pair-wise concurrence. Similarly, images containing bald people or persons with mustaches and beards, which are male specific attributes, may be discarded or discounted very heavily (and thus ranked more lowly) during retrieval 116 and/or ranking at 118 when one of the constituent attributes of the query is "woman." While an individual detector for the attribute "woman" may implicitly learn such features, experiments have found that when searching for images based on queries containing fine-grained parts and attributes, explicitly modeling the correlations and relationships between attributes can lead to substantially better results.

Ranking based on a single attribute can sometimes seem unnecessary: for example, for a single-attribute "beard" query, one can simply classify images into people with beards and people without beards. Multi-attribute queries, however, depending on the application, may have multiple levels of relevance for retrieval and ranking. For example, with respect to a "man wearing a red shirt and sunglasses" query, since sunglasses can be easily removed, it is reasonable to assume that images containing men wearing a red shirt but without sunglasses are also relevant to the query, and thus embodiments of the present invention might not remove such images but merely rank them lower as less relevant than images of men with both a red shirt and sunglasses. In another example, for two images that each have two of the query attributes, an image of a woman with a red shirt and sunglasses may be ranked lower than an image of a man in the red shirt with no sunglasses as a function of the learned pair-wise correlations, in one aspect, as sunglasses can be easily removed while the gender of a person cannot be easily changed. Traditionally, ranking is treated as a distinct problem within information retrieval. However, embodiments of the present invention integrate the ranking into the retrieval process in the same structured learning framework, where learning to rank and retrieve are simply optimizations of the same model according to different performance measures.

Supporting image retrieval and ranking based on multi-label queries is non-trivial, as the number of possible multi-label queries for a vocabulary of size L is $2^L$. Most prior art image ranking/retrieval approaches deal with this problem by learning separate classifiers for each individual label, and retrieving multi-label queries by heuristically combining the outputs of the individual labels. In contrast, embodiments of the present invention introduce a principled framework 106 for training and retrieval of multi-label queries, wherein attributes within a single object category and even across multiple object categories are interdependent so that modeling the correlations between them leads to significant performance gains in retrieval and ranking.

Some embodiments of the present invention use structured support vector machines (SVM) to address prediction problems involving complex outputs. Structured SVMs provide efficient solutions for structured output problems, while also modeling the interdependencies that are often present in the output spaces of such problems. They may be effectively used for object localization and modeling the concurrence relationships between attributes, posing a single learned framework at 108 for ranking and retrieval while also modeling the correlations between the attributes.

Embodiments of the present invention provide image retrieval and ranking based on the concept of reverse learning. Thus, given a set of labels $\{X\}$ and a set of training images $\{Y\}$, a mapping is learned corresponding to each label $\{x_i\}$ within the set of labels to predict a set of images $\{y^*\}$ that contain said label. Since reverse learning has a structured output (a set of images), it fits well into the structured prediction framework, and allows for learning based on the minimization of loss functions corresponding to a wide variety of performance measures: examples include hamming loss, precision and recall, other performance measures may also be practiced in embodiments of the present invention. The present approach improves upon the reverse learning approach in three different ways. First, a single framework provided for both retrieval and ranking. This is accomplished by adopting a ranking approach where the output is a set of images ordered by relevance, enabling integration of ranking and reverse learning within the same framework. Secondly, training is facilitated, as well as retrieval and ranking, based on queries consisting of multiple-labels. Finally, pair-wise correlations between different labels (attributes) are modeled and learned and exploited for retrieval and ranking.

Retrieval.

Given a set of labels in a multi-attribute query $\{Q\}$, which is a subset of the set of all possible attribute labels $\{X\}$, embodiments of the present invention retrieve images from an input source of images (for example, a source video, database, etc.) as the set of training images $\{Y\}$ that are relevant to the multi-attribute query label set $\{Q\}$. Under a reverse learning formulation, for an input an output may be determined for the set of images $\{y^*\}$ that contains all the constituent attributes $\{Q\}$ through a prediction function that maximizes a score over the weight vector $\{w\}$ according to equation (1):

$$y^* = \underset{y \subset \mathcal{Y}}{\operatorname{argmax}} w^T \psi(Q, y) \quad (1)$$

where the weight vector $\{w\}$ is composed of two components; $\{w^a\}$ for modeling the appearance of individual attributes and $\{w^p\}$ for modeling the dependencies between them. Components of equation (1) may be define as follows:

$$w^T \psi(Q, y) = \sum_{x_i \in Q} w_i^a \Phi_a(x_i, y) + \sum_{x_i \in Q} \sum_{x_j \in X} w_{ij}^p \Phi_p(x_j, y) \quad (2)$$

where $$\Phi_a(x_i, y) = \sum_{y_k \in y} \phi_a(x_i, y_k) \quad (3)$$

$$\Phi_p(x_j, y) = \sum_{y_k \in y} \phi_p(x_j, y_k) \quad (4)$$

More particularly, equation (3) defines a feature vector $\{\phi_a(x_i, y_k)\}$ representing image $y_k$ for attribute $x_i$. Equation (4) defines a vector $\{\phi_p(x_j, y_k)\}$ indicating the presence of attribute $x_j$ in image $y_k$, which is not known during a test phase and hence $\phi_p(x_j, y_k)$ may be treated as a latent variable, or set to be the output of an independently trained attribute detector. In equation (2), $w_i^a$ is a standard linear model for recognizing attribute x, based on the feature representation and we is a potential function encoding the correlation between the pair of attributes $x_i$ and $x_j$. By substituting (3) into the first part of (2), one can intuitively see that this represents the summation of the confidence scores of all the individual attributes x, in the query Q, over all a subset of the images $y_k$. Similarly, the second (pair-wise) term in (2) represents the correlations between the query attributes $x_i$ and the entire set of attributes X, over images in the set y. Hence, the pair-wise term ensures that information from attributes that are not present in the query attribute set Q are also utilized for retrieving the relevant images.

Thus, given a set of multi-label training images and their respective labels, embodiments of the present invention train a model for the weight vector {w} which given a multi-label sub-set query {Q} can correctly predict the subset of images {y*} in a test set {$Y_t$} which contain all the labels $x_j$. In general, training includes all queries (containing a single attribute as well as multiple attributes) that occur in the training set. During the training phase, embodiments of the present invention learn the weight vector {w} such that, for each query {Q} the desired output set of retrieved images {y*} has a higher score (equation (1)) than any other set {y}. This can be performed using a standard max-margin training formulation:

$$\underset{w,\xi}{\arg\min} \quad w^T w + C \sum_t \xi_t \qquad (5)$$

$$\forall t \quad w^T \psi(Q_t, y_t^*) - w^T \psi(Q_t, y_t) \geq \Delta(y_t^*, y_t) - \xi_t$$

where C is a parameter controlling the trade-off between the training error and regularization, {$Q_t$} is a set of training queries {$\xi_t$} is the slack variable corresponding to {$Q_t$}, and {$\Delta(y^*_t, y_t)$} is a loss function. Unlike standard SVMs which use a simple 0/1 loss, embodiments of the present invention may thus employ a complex loss function, which enables heavily (or gently) penalizing outputs {$y_t$} that deviate significantly (or slightly) from the correct output {$y^*_t$} measured based on an optimizing performance metric. For example, {$\Delta(y^*_t, y_t)$} may be defined for optimizing training error based on different performance metrics as follows:

$$\Delta(y_t^*, y_t) = \begin{cases} 1 - \frac{|y_t \cap y_t^*|}{|y_t|} & \text{precision} \\ 1 - \frac{|y_t \cap y_t^*|}{|y_t^*|} & \text{recall} \\ 1 - \frac{|y_t \cap y_t^*| + |\bar{y}_t \cap \bar{y}_t^*|}{|\mathcal{Y}|} & \text{hamming loss} \end{cases} \qquad (6)$$

Similarly, one can optimize for other performance measures such as F/Beta, an F-score (or F-measure) performance metric having a non-negative real "beta" weight. In one aspect, the reverse learning approach according to embodiments of the present invention allows one to train a model optimizing for a variety of performance measures.

The quadratic optimization problem in Equation (5) contains {$O(|Q|2^{|\mathcal{Y}|})$} constraints, which is exponential in the number of training instances. Hence, embodiments of the present invention may adopt a constraint generation strategy comprising an iterative procedure that involves solving Equation (5), initially without any constraints, and then at each iteration adding the most violated constraint of the current solution to the set of constraints. At each iteration of the constraint generation process, the most violated constraint is given by:

$$\xi_t \geq \max_{y_t \subset \mathcal{Y}} [\Delta(y_t^*, y_t) - (w^T \psi(Q_t, y_t^*) - w^T \psi(Q_t, y_t))] \qquad (7)$$

Equation (7) can be solved in $O(|2^{|\mathcal{Y}|}|^2)$ time. During prediction, embodiments solve for (1), which can be efficiently performed in $O(|2^{|\mathcal{Y}|}| \log(|2^{|\mathcal{Y}|}|))$.

Ranking.

With minor modifications the framework for image retrieval is also utilized for ranking multi-label queries. In the case of image ranking, given the multi-attribute query {Q}, the images in the set of images {Y} may be ranked according to their relevance to the {Q} attributes. Unlike image retrieval, where given an input {Q} the output is a subset of test images, in the case of ranking the output of a prediction function is a permutation {z*} of the set of images defined by equation (8):

$$z^* = \underset{z \in \pi(\mathcal{Y})}{\arg\max} \, w^T \psi(Q, z) \qquad (8)$$

where $\lambda(2^{|\mathcal{Y}|})$ is the set of all possible permutations of the set of images $2^{|\mathcal{Y}|}$. Thus, the weight vector {w} may be used to rank through equation (9):

$$w^T \psi(Q, z) = \sum_{x_i \in Q} w_i^a \hat{\phi}_a(x_i, z) + \sum_{x_i \in Q} \sum_{x_j \in \mathcal{X}} w_{ij}^p \hat{\phi}_p(x_j, z) \qquad (9)$$

where $$\hat{\phi}_a(x_i, z) = \sum_{z_k \in z} A(r(z_k)) \phi_a(x_i, z_k) \qquad (10)$$

$$\hat{\phi}_p(x_j, z) = \sum_{z_k \in z} A(r(z_k)) \phi_p(x_j, z_k) \qquad (11)$$

A(r) is any non-increasing function, and {$r(z_k)$} is the rank of image $z_k$. Further, retrieved results ranked may be limited to a top set {K} by defining A(r) as:

$$A(r) = \max(K+1-r, 0) \qquad (12)$$

In one aspect, this may ensure that the lower (top) ranked images are assigned higher weights, and since the equation equals zero for results greater than K, only the top K images of the ranking are considered.

In contrast to prior art ranking methods which simply divide a set of training images into two sets (relevant and irrelevant) corresponding to each query and just learn a binary ranking, embodiments of the present invention utilize multiple levels of relevance. For example, given a query {Q} training images may be divided into {|Q|+1} sets based on their relevance. Thus, the most relevant set comprising images that contain all the attributes in the query |Q| may be assigned a relevance {rel(j)=|Q|}, the next set consists of images containing any {|Q|−1} of the attributes which are assigned a relevance {rel(j)=|Q|−1} and so on, with a last set consisting of images with none of the attributes present in the query assigned relevance rel(j)=0. This ensures that, in case there are no images containing all the query attributes, images that contain the most number of attributes are ranked highest. Further, while equal weights may be assigned to all attributes, in some embodiments the attributes may be weighted. For example, in one embodiment, higher weights are assigned to attributes involving race or gender which are more difficult to modify, resulting in higher rankings relative to lower-weighted apparel attributes that can be easily changed (e.g. wearing sunglasses, red shirt, etc.).

Thus, embodiments of the present invention may train a ranking model using a max-margin framework pursuant to equation (13):

$$\underset{w,\xi}{\arg\min} \quad w^T w + C \sum_l \xi_l \quad (13)$$

$$\forall t \quad w^T \psi(Q_t, z_t^*) - w^T \psi(Q_t, z_t) \geq \Delta(z_t^*, z_t) - \xi_t$$

where $\{\Delta(z, *z)\}$ is a function denoting the loss incurred in predicting a permutation $\{z\}$ instead of a correct permutation $\{z^*\}$, and may be defined as $\{\Delta(z,*z)=1-NDCG@100(z,*z)\}$ wherein (NDCG) is a normalized discount cumulative gain score, a standard measure used for evaluating ranking algorithms that may be defined by equation (14):

$$NDCG@k = \frac{1}{Z} \sum_{j=1}^{k} \frac{2^{rel(j)} - 1}{\log(1+j)} \quad (14)$$

where rel(j) is the relevance of the $j^{th}$ ranked image and Z is a normalization constant to ensure that the correct ranking results in an NDCG score of 1. Since NDCG@100 takes into account only the top 100 ranked images, we may set K=100 in Equation (12).

In the case of ranking, the max-margin problem (Equation 13) again contains an exponential number of constraints and we adopt the constraint generation procedure, where the most violated constraint is iteratively added to the optimization problem. The most violated constraint is given by:

$$\xi_t \geq \max_{z_t \in \pi(\mathcal{Y})} [\Delta(z_t^*, z_t) - (w^T \psi(Q_t, z_t^*) - w^T \psi(Q_t, z_t))] \quad (15)$$

which, after omitting terms independent of $z_t$ and substituting Equations (9), (10), (14) can be rewritten as:

$$\underset{z_t \in \pi(\mathcal{Y})}{\arg\max} \sum_{k=1}^{100} A(z_k) W(z_k) - \sum_{k=1}^{100} \frac{2^{rel(z_k)} - 1}{\log(1+k)} \quad (16)$$

where:

$$W(z_k) = \sum_{x_i \in Q_t} w_i^a \phi_a(x_i, z_k) + \sum_{x_j \in Q_t} \sum_{x_j \in X} w_{ij}^p \phi_p(x_j, z_k) \quad (17)$$

Equation (16) is a linear assignment problem in $z_k$ and can be efficiently solved using a Kuhn-Munkres algorithm. During prediction, Equation (8) needs to be solved, which can be rewritten as:

$$\underset{z \in \pi(\mathcal{Y})}{\arg\max} \sum_k A(r(z_k)) W(z_k) \quad (18)$$

Since $A(z_j)$ is a non-increasing function, ranking can be performed by simply sorting the samples according to the values of $W(z_k)$.

Figure 4:
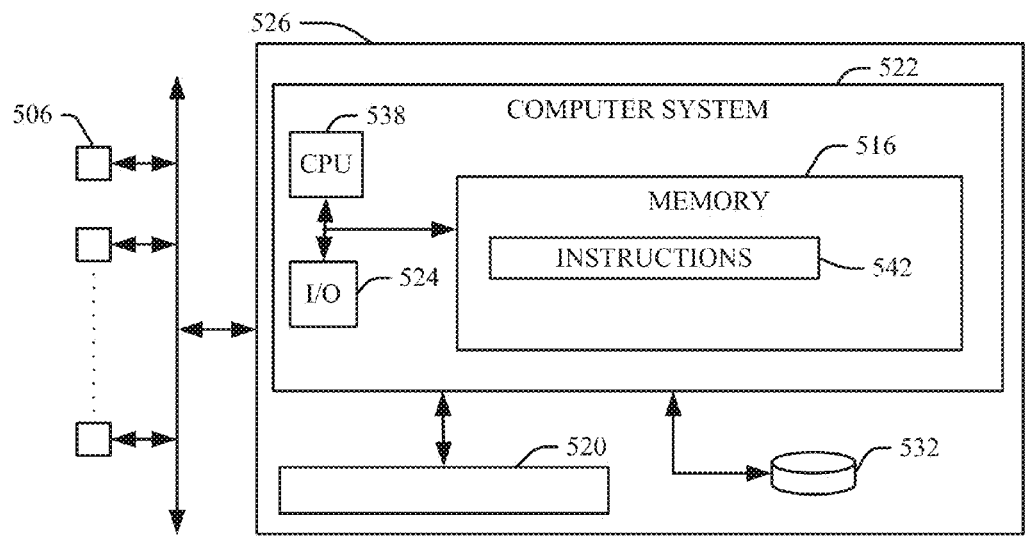
FIG. 4 is a block diagram illustration of a computerized implementation of an embodiment of the present invention.

Referring now to FIG. 4, an exemplary computerized implementation of an embodiment of the present invention includes computer or other programmable device 522 in communication with other devices 506 (for example, a video or still image camera or server, or a memory device comprising a database of images, etc.) that retrieves and ranks multi-attribute query results according to relevance to the multi-attribute query as described above with respect to FIGS. 1 through 3. For example, in response to implementing computer readable code instructions 542 residing in a computer memory 516 or a storage system 532 or in another device 506 accessed through a computer network infrastructure 526, the processor (CPU) 538 may provide retrieve and rank multi-attribute query results according to relevance to the multi-attribute query as described above with respect to FIGS. 1 through 3.

Figure 5:
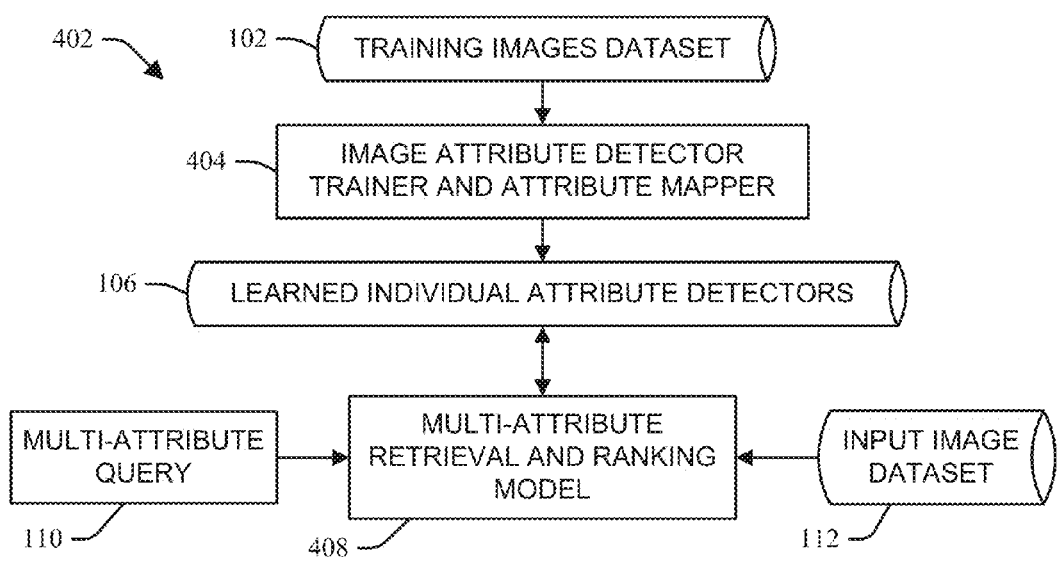
FIG. 5 is a block diagram illustration of an apparatus or device embodiment of the present invention.

FIG. 5 illustrates an apparatus or device embodiment 402 of the present invention that ranks multi-attribute query results according to relevance to the multi-attribute query. More particularly, an Image Attribute Detector Trainer and Attribute Mapper 404 trains or learns image detectors and thereby generates the set of individual detectors 106 (FIG. 1) for each of the annotated attributes in the training dataset 102 (FIG. 1) and further learns pair-wise correlations between the attributes from the training dataset. Thus, a Multi-Attribute Retrieval and Ranking Model 408 searches via the trained attribute detectors 106 the image dataset 112 for images comprising at least one of a multi-attribute query 110 subset plurality of the annotated attributes; retrieves images that each comprise at least one of the query subset plurality of attributes and in response to information from the trained attribute detectors corresponding to attributes that are not a part of the query but are relevant to the query attributes as a function of the learned plurality of pair-wise correlations; and ranks the retrieved plurality of images as a function of respective total numbers of their attributes that are also within the query subset plurality of attributes.

Embodiments may also perform processes or provides embodiments of the present invention on a subscription, advertising, and/or fee basis. That is, a service provider could offer to provide automated retrieval and ranking of multi-attribute query results according to relevance to the multi-attribute query as described above with respect to FIGS. 1 through 5. Thus, the service provider can create, maintain, and support, etc., a computer infrastructure, such as the network computer system 522 and/or network environment 526 that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for executing one or more of the processes, systems and articles for providing automated searches of images and rankings with respect to query attributes as described above with respect to FIGS. 1-4. In this case, a computer infrastructure, such as the computer 522 or network infrastructure 526, or the apparatus or device embodiment 402, can be provided and one or more systems for performing the process steps of the invention can be obtained (e.g., created, purchased, used, modified, etc.), for example deployed to the computer 522 infrastructure or the apparatus or device embodiment 402. To this extent, the deployment of a system or device can comprise one or more of: (1) installing program code on a computing device, such as the computers/devices 522, from a computer-readable medium device 516, 520 or 506, the Image Attribute Detector Trainer 404 or the Multi-Attribute Retrieval and Ranking Model Trainer 408; (2) adding one or more computing devices to the computer infrastructure 522 or the apparatus or device embodiment 402; and (3) incorporating and/or modifying one or more existing systems of the computer infrastructure or device to enable the computer infrastructure or device to perform the process steps of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for retrieving and ranking multi-attribute query results according to relevance to attributes of a multi-attribute query, the method comprising:
    training each of a plurality of image attribute detectors for one each of a plurality of different attributes that are annotated in a training dataset of images of people;
    learning via a processor a plurality of pair-wise correlations between each pair of the plurality of annotated attributes from the training dataset of images;
    searching via the trained attribute detectors an input image dataset for images comprising at least one of a multi-attribute query subset plurality of the annotated attributes;
    retrieving a plurality of images from the searching of the input image dataset that each comprise at least one of the query subset plurality of attributes; and
    ranking the retrieved plurality of images as a function of comprising different ones of the attributes that are not within the query subset plurality of attributes but are paired to the at least one of the query subset plurality of attributes by the pair-wise correlations, wherein the ranking is an order of likelihood that the different ones of the attributes will appear in an image with the paired at least one of the query subset plurality of attributes.

2. The method of claim 1, further comprising:
    integrating computer-readable program code into a computer system comprising the processor, a computer readable memory in circuit communication with the processor, and a computer readable storage medium in circuit communication with the processor; and
    wherein the processor executes program code instructions stored on the computer-readable storage medium via the computer readable memory and thereby performs the steps of training each of the plurality of image attribute detectors, learning the plurality of pair-wise correlations between each pair of the plurality of annotated attributes from the training dataset of images, searching via the trained attribute detectors the input image dataset for images comprising at least one of a multi-attribute query subset plurality of the annotated attributes, retrieving the plurality of images from the searching of the input image dataset that each comprise at least one of the query subset plurality of attributes, and ranking the retrieved plurality of images as a function of comprising different ones of the attributes that are not within the query subset plurality of attributes but are paired to the at least one of the query subset plurality of attributes by the pair-wise correlations.

3. The method of claim 1, wherein a first of the annotated attributes is more heavily weighted than a second of the annotated attributes; and
    wherein the ranking the retrieved plurality of images further comprises ranking a one of the results with the more heavily weighted first attribute higher than another of the results that has the second attribute and a same total number of the attributes that are also within the query subset plurality of attributes.

4. The method of claim 3, wherein the learning the plurality of pair-wise correlations between each pair of the plurality of annotated attributes further comprises:
    reverse learning a mapping of a set of labels of the annotated attributes to the images in the training dataset of images to predict respective sets of the training dataset images that each contain one of the annotated attribute labels.

5. The method of claim 4, wherein the retrieving the plurality of images from the searching of the input image dataset that each comprise at least one of the query subset plurality of attributes further comprises:
    predicting the retrieved plurality of images by maximizing weighted feature vectors extracted by each of the trained image attribute detectors as a function of a component modeling an appearance of the attribute of the each of the trained image attribute detectors, and a component modeling a dependency between the attribute of the each of the attributes of the trained image attribute detectors to another one of the annotated attributes in the training dataset of images that is not in the query subset plurality of attributes.

6. The method of claim 5, wherein the learning the pair-wise correlations is a max-margin training.

7. The method of claim 6, wherein the predicting the retrieved plurality of images by maximizing the weighted feature vectors extracted by each of the trained image attribute detectors further comprises:
    employing a complex loss function to more heavily penalize one of the weighted feature vector outputs that deviates more from a correct output measured based on an optimized performance metric than another of the weighted feature vector outputs having a lesser deviation from the correct output measured based on the optimized performance metric.

8. The method of claim 7, wherein the max-margin training further comprises:
generating a plurality of constraints; and
iteratively adding most violated constraints of the generating a plurality of constraints to the optimized performance metric.

9. A system, comprising:
a processing unit, a computer readable memory and a computer readable storage medium;
first program instructions to train each of a plurality of image attribute detectors for one each of a plurality of different attributes that are annotated in a training dataset of images of people;
second program instructions to learn a plurality of pair-wise correlations between each pair of the plurality of annotated attributes from the training dataset of images;
third program instructions to search via the trained attribute detectors an input image dataset for images comprising at least one of a multi-attribute query subset plurality of the annotated attributes; and
fourth program instructions to retrieve a plurality of images from the searching of the input image dataset that each comprise at least one of the query subset plurality of attributes, the fourth program instructions further to rank the retrieved plurality of images as a function of comprising different ones of the attributes that are not within the query subset plurality of attributes but are paired to the at least one of the query subset plurality of attributes by the pair-wise correlations, wherein the ranking is an order of likelihood that the different ones of the attributes will appear in an image with the paired at least one of the query subset plurality of attributes; and
wherein the first, second, third and fourth program instructions are stored on the computer readable storage medium for execution by the processing unit via the computer readable memory.

10. The system of claim 9, wherein a first of the annotated attributes is more heavily weighted than a second of the annotated attributes; and
wherein the fourth program instructions are further to rank the retrieved plurality of images by ranking a one of the results with the more heavily weighted first attribute higher than another of the results that has the second attribute and a same total number of the attributes that are also within the query subset plurality of attributes.

11. The system of claim 10, wherein the second program instructions are further to learn the plurality of pair-wise correlations between each pair of the plurality of annotated attributes by reverse learning a mapping of a set of labels of the annotated attributes to the images in the training dataset of images to predict respective sets of the training dataset images that each contain one of the annotated attribute labels.

12. The system of claim 11, wherein the fourth program instructions are further to retrieve the plurality of images from the searching of the input image dataset that each comprise at least one of the query subset plurality of attributes by:
predicting the retrieved plurality of images by maximizing weighted feature vectors extracted by each of the trained image attribute detectors as a function of a component modeling an appearance of the attribute of the each of the trained image attribute detectors, and a component modeling a dependency between the attribute of the each of the attributes of the trained image attribute detectors to another one of the annotated attributes in the training dataset of images that is not in the query subset plurality of attributes.

13. The system of claim 12, wherein the learning the pair-wise correlations is a max-margin training.

14. The system of claim 13, wherein the fourth program instructions are further to predict the retrieved set of images by maximizing the weighted feature vectors extracted by each of the trained image attribute detectors by employing a complex loss function to more heavily penalize one of the weighted feature vector outputs that deviates more from a correct output measured based on an optimized performance metric than another of the weighted feature vector outputs having a lesser deviation from the correct output measured based on the optimized performance metric; and
wherein the second program instructions are further to learn the pair-wise correlations through the max-margin training by generating a plurality of constraints and iteratively adding most violated constraints of the generating a plurality of constraints to the optimized performance metric.

15. An article of manufacture, comprising:
a computer readable hardware storage device having computer readable program code embodied therewith, the computer readable program code comprising instructions executed by a processor that cause the processor to:
train each of a plurality of image attribute detectors for one each of a plurality of different attributes that are annotated in a training dataset of images of people;
learn a plurality of pair-wise correlations between each pair of the plurality of annotated attributes from the training dataset of images;
search via the trained attribute detectors an input image dataset for images comprising at least one of a multi-attribute query subset plurality of the annotated attributes;
retrieve a plurality of images from the searching of the input image dataset that each comprise at least one of the query subset plurality of attributes; and
rank the retrieved plurality of images as a function of comprising different ones of the attributes that are not within the query subset plurality of attributes but are paired to the at least one of the query subset plurality of attributes by the pair-wise correlations, wherein the ranking is an order of likelihood that the different ones of the attributes will appear in an image with the paired at least one of the query subset plurality of attributes.

16. The article of manufacture of claim 15, wherein a first of the annotated attributes is more heavily weighted than a second of the annotated attributes; and wherein the computer readable program code instructions executed by the processor further cause the processor to rank the retrieved plurality of images by ranking a one of the results with the more heavily weighted first attribute higher than another of the results that has the second attribute and a same total number of the attributes that are also within the query subset plurality of attributes.

17. The article of manufacture of claim 16, wherein the computer readable program code instructions executed by the processor further cause the processor to learn the plurality of pair-wise correlations between each pair of the plurality of annotated attributes by reverse learning a mapping of a set of labels of the annotated attributes to the images in the training dataset of images to predict respective sets of the training dataset images that each contain one of the annotated attribute labels.

18. The article of manufacture of claim 17, wherein the computer readable program code instructions executed by the processor further cause the processor to retrieve the plurality of images from the searching of the input image dataset that each comprise at least one of the query subset plurality of attributes by:

predicting the retrieved plurality of images by maximizing weighted feature vectors extracted by each of the trained image attribute detectors as a function of a component modeling an appearance of the attribute of the each of the trained image attribute detectors, and a component modeling a dependency between the attribute of the each of the attributes of the trained image attribute detectors to another one of the annotated attributes in the training dataset of images that is not in the query subset plurality of attributes.

19. The article of manufacture of claim 18, wherein the learning the pair-wise correlations is a max-margin training.

20. The article of manufacture of claim 19, wherein the computer readable program code instructions executed by the processor further cause the processor to:

predict the retrieved set of images by maximizing the weighted feature vectors extracted by each of the trained image attribute detectors by employing a complex loss function to more heavily penalize one of the weighted feature vector outputs that deviates more from a correct output measured based on an optimized performance metric than another of the weighted feature vector outputs having a lesser deviation from the correct output measured based on the optimized performance metric; and learn the pair-wise correlations through the max-margin training by generating a plurality of constraints, and iteratively adding most violated constraints of the generating a plurality of constraints to the optimized performance metric.

* * * * *